US012325067B2

(12) United States Patent
Opprecht et al.

(10) Patent No.: US 12,325,067 B2
(45) Date of Patent: Jun. 10, 2025

(54) METHOD FOR MANUFACTURING AN ALUMINIUM ALLOY PART BY ADDITIVE MANUFACTURING FROM A POWDER MIXTURE CONTAINING $ZrSi_2$ PARTICLES

(71) Applicant: COMMISSARIAT À L'ÉNERGIE ATOMIQUE ET AUX ÉNERGIES ALTERNATIVES, Paris (FR)

(72) Inventors: Mathieu Opprecht, Grenoble (FR); Jean-Paul Garandet, Grenoble (FR); Guilhem Roux, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/453,781

(22) Filed: Nov. 5, 2021

(65) Prior Publication Data
US 2022/0143702 A1 May 12, 2022

(30) Foreign Application Priority Data
Nov. 10, 2020 (FR) .......................... 2011559

(51) Int. Cl.
B22F 10/28 (2021.01)
B22F 1/054 (2022.01)
(Continued)

(52) U.S. Cl.
CPC .............. *B22F 10/28* (2021.01); *B22F 1/054* (2022.01); *B33Y 70/00* (2014.12);
(Continued)

(58) Field of Classification Search
None
See application file for complete search history.

(56) References Cited

U.S. PATENT DOCUMENTS 6,042,780 A * 3/2000 Huang ................ A61F 2/30767
264/225
2014/0283651 A1 * 9/2014 Oda ....................... B22D 27/20
75/684
(Continued)

FOREIGN PATENT DOCUMENTS
DE 1248302 B 8/1967
EP 2767608 B1 8/2016
(Continued)

OTHER PUBLICATIONS

Akiyama et al. P/M Mateirals of Al—Mg-oxide and Al—Mg-silicide Systems Processed by Mechanical Alloying. J. Jpn. Soc. Powder Powder Metallurgy vol. 52, No. 9. 2005. 670-675. (Year: 2005).*

(Continued)

*Primary Examiner* — Paul A Wartalowicz
*Assistant Examiner* — Stephani Hill
(74) *Attorney, Agent, or Firm* — Chrisman Gallo Tochtrop LLC

(57) ABSTRACT

Method for manufacturing an aluminium alloy part by additive manufacturing that includes a step in which a layer of a mixture of powders is locally melted then solidified, wherein the mixture of powders includes: first particles that include at least 80 wt. % aluminium and up to 20 wt. % one (Continued)

or more additional elements, and second particles of $ZrSi_2$, the mixture of powders including 1.8 wt. % to 4 wt. % second particles.

12 Claims, 3 Drawing Sheets

(51) Int. Cl.
  *B33Y 10/00* (2015.01)
  *B33Y 70/00* (2020.01)
(52) U.S. Cl.
  CPC ... *B22F 2301/052* (2013.01); *B22F 2304/054* (2013.01); *B22F 2304/056* (2013.01); *B22F 2304/058* (2013.01); *B22F 2304/10* (2013.01); *B33Y 10/00* (2014.12)

(56) References Cited

U.S. PATENT DOCUMENTS

| | | | |
|---|---|---|---|
| 2017/0114847 A1* | 4/2017 | Ferrari | B22F 1/17 |
| 2018/0214949 A1* | 8/2018 | Martin | B22F 1/08 |
| 2018/0226095 A1* | 8/2018 | Murase | G11B 5/73913 |
| 2018/0241944 A1* | 8/2018 | Uemura | H04N 23/90 |
| 2019/0032175 A1* | 1/2019 | Martin | C22C 1/1084 |
| 2019/0039183 A1 | 2/2019 | Morton et al. | |
| 2019/0245224 A1 | 8/2019 | Lacroix et al. | |
| 2019/0326621 A1 | 10/2019 | Planque et al. | |
| 2019/0372137 A1 | 12/2019 | Planque et al. | |
| 2020/0313217 A1 | 10/2020 | Planque et al. | |
| 2020/0360993 A1 | 11/2020 | Opprecht et al. | |
| 2020/0403261 A1 | 12/2020 | Bernard et al. | |
| 2021/0344022 A1 | 11/2021 | Planque et al. | |
| 2021/0391585 A1 | 12/2021 | Bernard et al. | |
| 2022/0029048 A1 | 1/2022 | Ollier et al. | |
| 2024/0300018 A1* | 9/2024 | Opprecht | B33Y 70/00 |

FOREIGN PATENT DOCUMENTS

| | | | | |
|---|---|---|---|---|
| EP | 3479926 A1 | * | 5/2019 | |
| GB | 1047535 A | | 6/1964 | |
| WO | WO 89/10982 | * | 11/1989 | ............... C22C 1/02 |
| WO | 2018144323 A1 | | 8/2018 | |

OTHER PUBLICATIONS

Opprecht et al. A solution to the hot cracking problem for aluminum alloys manufactured by laser beam melting. Acta Materialia 197 (2020) 40-53. (Year: 2020).*

Zhang et al. Effects of zirconium addition on crack, microstructure and mechanical behavior of selective laser melted Al—Cu—Mg alloy. Scripta Materialia 134 (2017) 6-10. (Year: 2017).*

Li et al. Microstructures and tensile properties of a selective laser melted Al—Zn—Mg—Cu (Al7075) alloy by Si and Zr microalloying. Materials Science & Engineering A 787 (2020) 139492. (Year: 2020).*

Kula et al. Effect of annealing temperature on the structure and mechanical properties of mechanically alloyed AlMg—Nb2O5 and AlMg—ZrSi2 composites. Journal of Microscopy, vol. 237, Pt. 3 2010, pp. 421-426. (Year: 2010).*

Astapchik et al. Laser alloying of aluminum alloys. Vestsi Akademii Navuk BSSR, Seryya-Fizika-Tekhnichnykh Navuk (1991) (1) 12-18. STN Abstract (Year: 1991).*

Kaneko et al. Mechanically alloyed P/M composites of Al—Mg-Silicide and Al—Mg-Oxide systems. Materials Science Forum. vols. 539-543, pp. 854-859. 2007. (Year: 2007).*

Search Report for French application No. FR2011559 dated Jul. 7, 2021.

Martin, John H. et al., "3D printing of high-strength aluminium alloys", Nature Sep. 21, 2017, vol. 549, pp. 365-380.

Manley et al., "On the elaboration of composite AlSi7Mg0.6/SiC powders and parts by laser powder bed fusion"; J Mater Sci, pp. 1-18, Mar. 9, 2023.

* cited by examiner

METHOD FOR MANUFACTURING AN ALUMINIUM ALLOY PART BY ADDITIVE MANUFACTURING FROM A POWDER MIXTURE CONTAINING ZrSi$_2$ PARTICLES

CROSS-REFERENCE TO RELATED APPLICATIONS

This application claims priority from French Patent Application No. 2011559 filed on Nov. 10, 2020. The content of this application is incorporated herein by reference in its entirety.

TECHNICAL FIELD

The present invention relates to the general field of manufacturing aluminium alloy parts by additive manufacturing.

The invention relates to a method for manufacturing aluminium alloy parts.

The invention also relates to an aluminium alloy part obtained by this method.

The invention is of particular interest as it makes it possible to overcome problems of hot cracking in aluminium alloys in additive manufacturing methods that involve melting.

The invention has applications in numerous industrial fields, in particular in automotive and aeronautical fields or for the structural reinforcement of aluminium alloys.

PRIOR ART

A common aspect of the different methods for manufacturing metal alloy parts by additive manufacturing (also referred to as 3D printing) is that they use raw material in the form of powders and shape the metal alloy in a step of melting these powders.

The different methods for additive manufacturing concerned include, in particular and in an non-exhaustive manner, methods for powder bed fusion (PBF) and methods for directed energy deposition (DED).

The PBF methods consist in melting certain regions of a powder bed, for example by means of a laser beam. The DED methods consist in introducing the solid material, for example in the form of wire or powder, melting it, for example by means of a laser beam, and depositing the melted material.

With such methods, it is possible to industrially produce parts, with a simple or complex form, which have satisfactory mechanical properties.

However, some aluminium alloys are subject to problems with hot cracking as a result of columnar dendritic solidification, creating a microstructure which is sensitive to thermomechanical stresses during the solidification, particularly for a solid fraction close to unity, typically ranging from 0.9 to 0.98.

To overcome this disadvantage, different solutions have been envisaged.

For example, it is possible to modify the chemical composition of the alloy powder, as is the case for example with Scamalloy. This is a light alloy comprising aluminium, magnesium and scandium, developed specifically for additive manufacturing. During the solidification, primary Al$_3$Sc particles precipitate from liquid and act as seeds for the grain growth of the Al matrix. Scandium therefore enables a refinement of the microstructure and the development of equiaxed dendritic solidification. However, scandium is a particularly expensive element, which considerably increases the costs of raw material.

Another solution consists in adding nanoparticles of a so-called germinating material, cheaper than scandium, to the aluminium powder in order to encourage equiaxed solidification.

For example, in document WO 2018/144323 A1, aluminium alloy powders are mixed with nanoparticles of Zr, Ta, Nb, Ti or any of their oxides, nitrides, hydrides, borides, carbides and aluminides to manufacture aluminium alloy parts by additive manufacturing. Among the various embodiments described, parts are manufactured by selective laser melting (SLM) for example from a mixture comprising:

aluminium and tantalum nanoparticles with a diameter of 50 nm (1% by volume), or an aluminium alloy (Al7075 or Al6061) and zirconium nanoparticles with a diameter of 500-1500 nm (1% by volume).

In the article by Martin et al ("3D printing of high-strength aluminium alloys", Nature 549 (2017), pages 365-369), aluminium alloy powders of series 7075 (bimodal distribution at 15 μm and 45 μm) and 6061 (d$_{50}$ of 45 μm) were mixed with 1% by volume of hydrogen-stabilised zirconium nanoparticles (ZrH$_2$) to remedy the problem of hot cracking in SLM-produced aluminium alloys. The nanoparticles are electrostatically bonded to the base powder to obtain a uniform distribution. No information is given on the particle size of the nanoparticles used.

Finally, in the article by Opprecht et al ("A solution to the hot cracking problem for aluminum alloys manufactured by laser beam melting", Acta Materialia 197 (2020), 40-53), aluminum 6061 alloy parts are obtained by additive manufacturing. The addition of 2% by volume of yttria-stabilised zirconia (YSZ) particles to aluminium 6061 alloy particles makes it possible to refine the alloy 6061 and to completely eliminate cracking. The refinement method appears to involve the following steps: dissolution of YSZ particles (release of O and Zr), precipitation of Al/Mg oxides, germination of Al$_3$Zr on Al/Mg oxides, then germination and growth of the aluminium phase on Al$_3$Zr. The presence of oxygen is important for the germination of Al$_3$Zr which takes place on the aluminium and/or magnesium oxides.

The Al$_3$Zr particles formed during the method are responsible for the refinement of the microstructure. Their germinating power is mainly due to their crystallographic proximity to aluminium (Wang et al "Crystallographic study of Al$_3$Zr and Al$_3$Nb as grain refiners for Al alloys", Transactions of Nonferrous Metals Society of China 24 (2014), 2034-2040).

However, the use of yttria-stabilised zirconia particles leads to an increase in the oxygen content which is not a priori favourable for the use properties of these alloys. In particular, the oxygen causes the formation of oxides (Al$_2$O$_3$ for example), which are known to reduce the mechanical properties of the parts.

DESCRIPTION OF THE INVENTION

An aim of the present invention is to propose a method for manufacturing aluminium alloy parts without cracking, the method needing to be simple to implement and inexpensive.

To achieve this, the present invention proposes a method for manufacturing an aluminium alloy part by additive manufacturing comprising at least one step in which a layer of a mixture of powders is melted then solidified, the mixture of powders comprising:
first particles comprising at least 80 wt. % aluminium and up to 20 wt. % one or more additional elements, and second particles of $ZrSi_2$,
the mixture of powders comprising at least 1.5 wt. % second particles.

The invention differs fundamentally from the prior art by the addition of zirconium disilicide particles to the aluminium-based powder. The addition of such particles makes it possible to promote an equiaxed solidification structure and thus eliminate cracking in the final part.

Against all expectations, the inventors found that $Al_3Zr$ particles germinate on Al/Mg oxides, without the additional introduction of oxygen through the $ZrSi_2$ particles. Indeed, the use of $ZrSi_2$ deprives the method of a source of oxygen, compared to the use of yttria-stabilised zirconia. However, oxygen is important for the germination of $Al_3Zr$ which takes place on aluminium and/or magnesium oxides.

Furthermore, against all expectations, the $ZrSi_2$ particles give rise to germinating particles of $Al_3Zr$ by reaction with aluminium according to the following reactions (1) and (2):

$$ZrSi_2 \rightarrow Zr + 2Si \qquad (1)$$

$$3Al + Zr \rightarrow Al_3Zr \qquad (2)$$

Indeed, the thermodynamic data for reaction (1) shows that it is not favoured. At 1300K, its ΔG is largely positive and is 1.77 eV according to data from [1] in the reference at the end of the description. The $ZrSi_2$ phase is more stable than the dissociated elements.

It should be noted that the ΔG for the formation of the $Al_3Zr$ phase
(−0.43 eV [2] is less important than that of $ZrSi_2$ (−1.77 eV [1]) at 1300 K. In other words, the Zr element is more likely to remain with the Si element than to dissociate itself to form $Al_3Zr$.

Nevertheless, the inventors have observed that during the additive manufacturing process, the $Al_3Zr$ germinating phase is formed by the decomposition of $ZrSi_2$.

It did not seem obvious that this $Al_3Zr$ phase (reaction (2)) would have the time to germinate since the useful lives of the molten metal baths formed during the method are relatively short (from a hundred microseconds to a millisecond), whereas an incubation time of several tens of minutes, or even hours is generally used in a foundry to grow such particles ([3]). A first sight, this reaction of in situ formation of $Al_3Zr$ germinating particles from $ZrSi_2$ is neither thermodynamically or kinetically favoured by the thermal conditions imposed by the method.

Advantageously, the mixture of powders comprises from 1.9 wt. % to 2.5 wt. % second particles. In other words, the mixture of powders comprises from 1.9 wt. % to 2.5 wt. % second particles and from 97.5 wt. % to 98.1 wt. % first particles.

Advantageously, the second particles have a larger size ranging from 50 nm to 5000 nm.

In an even more advantageous manner, the second particles have a larger size ranging from 100 nm to 1000 nm, and even more preferably from 400 nm to 600 nm.

Advantageously, the first particles have a larger size ranging from 10 μm to 120 μm, and preferably from 20 μm to 65 μm.

Advantageously, the additional elements are selected from Cu, Si, Zn, Mg, Fe, Ti, Mn, Zr, Va, Ni, Pb, Bi and Cr.

Advantageously, the aluminium alloy is alloy 7075, alloy 6061, alloy 2219 or alloy 2024.

According to a first advantageous embodiment, the manufacturing method is a selective laser melting process.

According to a second advantageous embodiment, the manufacturing method is a selective electron beam melting process.

Advantageously, the mixing of the powders is performed in a 3D dynamic mixer.

The method has numerous advantages:
it is simple to implement, since it is only necessary to mix the powders. It consists in a dry step, is quick to perform and easy to set up, regardless of the quantity of powders,
it is inexpensive, and therefore of interest from an industrial point of view. As an illustration, the material cost of aluminium alloy 6061 is approximately €60/kg and the material cost of a mixture of powders comprising aluminium alloy 6061 and $ZrSi_2$ (1.9 wt. %) is approximately €68/kg; tantalum oxides and $ZrH_2$ are significantly more expensive than $ZrSi_2$ (at least 3 times more expensive),
it is easy to store/handle the $ZrSi_2$ powder,
there is no need to introduce oxygen during the addition of $ZrSi_2$, which limits the presence of oxides in the final alloy,
it is possible to easily modify the mass ratio between the powders at the time of mixing the powder,
it can be adapted easily to any additive manufacturing process and to any aluminium alloy (subject to the problem of hot cracking),
the microstructure of aluminium alloys can be refined and thus the anisotropy of parts obtained by additive manufacturing can be limited,
the mechanical properties of the parts obtained can be increased (structural reinforcement by the untransformed particles),
it is possible to use the parameters generally used in the additive manufacturing methods.

The invention also relates to an aluminium alloy part, obtained according to the previously described method, the part comprising $ZrSi_2$. The part is free of cracking/fissure.

Further features and advantages of the invention will become apparent from the further description below.

It goes without saying that this further description is only given to illustrate the object of the invention and should in no way be interpreted as a limitation of this object.

BRIEF DESCRIPTION OF THE DRAWINGS

The present invention will be better understood from the description of exemplary embodiments, given by way of illustration only and not in any way limiting, with reference to the accompanying drawings in which.

DETAILED DESCRIPTION OF PARTICULAR EMBODIMENTS

Figure 1:
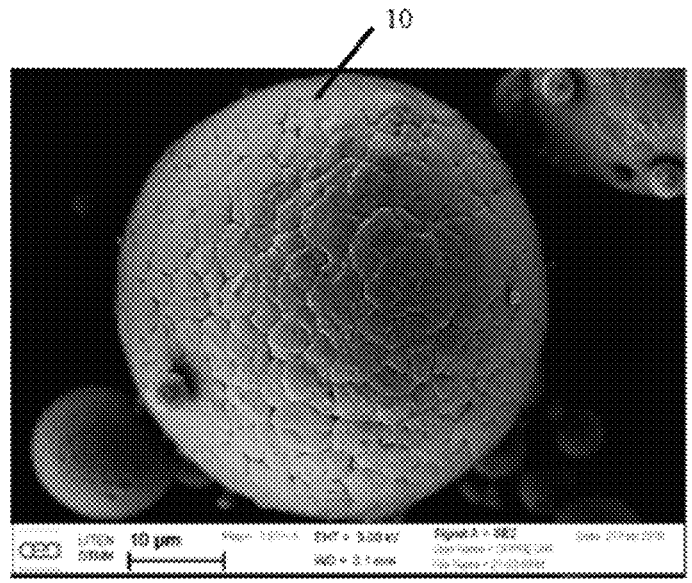
FIG. 1 is an image obtained by scanning electron microscope (SEM) of particles of aluminium alloy 6061.

The method for manufacturing an aluminium alloy part by additive manufacturing comprises the following successive steps:
providing a mixture of powders comprising, and preferably consisting of:
a first powder comprising first particles 10 made from a first material comprising at least 80 wt. % aluminium and up to 20 wt. % of one or more additional elements,
a second powder comprising second particles 20 of a second material, the second material being $ZrSi_2$,
b) forming a layer of the mixture of powders,
c) locally melting the layer of the mixture of powders, preferably by laser beam scanning or by electron beam scanning, so as to form successively a plurality of melted areas,
d) cooling the plurality of areas melted in step c) so as to form a plurality of solidified areas, this plurality of solidified areas consisting of the first elements of the parts to be constructed.

Advantageously, steps b), c) and d) can be repeated at least once so as to form at least one other solidified area on the first solidified area. The method is repeated until the final form of the part is obtained. The first layer of the mixture of powders is formed on a substrate.

The addition of $ZrSi_2$ particles 20 to the aluminium-based first particles 10 of interest makes it possible to obtain a substantially equiaxed solidification structure and a crack-free final aluminium alloy part.

Preferably, the first particles 10 are functionalised by the second particles 20, for example by electrostatic grafting.

Preferably, the second particles 20 consist of $ZrSi_2$.

The second $ZrSi_2$ powder preferably represents from 1.8 wt. % to 4 wt. % of the mixture of powders. In other words, the mixture of powders comprises from 1.8 wt. % to 4 wt. % second particles and from 96 wt. % to 98.2 wt. % first particles. The second $ZrSi_2$ powder represents, even more preferably, 1.9 wt. % to 2.5 wt. % of the mixture of powders. In other words, the mixture of powders comprises 1.9 wt. % to 2.5 wt. % second particles and 97.5 wt. % to 98.1 wt. % first particles.

According to an advantageous embodiment, the first particles 10 have a larger size ranging from 10 μm to 120 μm and preferably from 20 μm to 65 μm.

Advantageously, the second particles 20 have a larger size ranging from 50 nm to 5000 nm and, preferably from 100 nm to 1000 nm, even more preferably from 400 nm to 600 nm.

The first particles 10 and the second particles 20 may be for example, elements which can have a spherical, ovoid or elongated form. Preferably, the particles are substantially spherical and their largest dimension is their diameter.

The first powder is formed by first particles 10 made from a first material. The first material comprises at least 80 wt. % aluminium, and preferably at least 90 wt. % aluminium.

The first particles 10 can comprise up to 20% and preferably up to 10 wt. % of one or more additional elements (also referred to as alloy elements). These elements are preferably selected from zinc, magnesium, copper, silicon, iron, manganese, titanium, vanadium, bismuth, lead, nickel, zirconium and chromium.

Preferably, the alloy is aluminium alloy 7075, alloy 2024, alloy 2219 or aluminium alloy 6061.

The mixture of powders provided in step a) is made upstream of the additive manufacturing process.

In a preferred embodiment of the invention, the first powder and the second powder are mixed in the 3D dynamic mixer, for example with a Turbula® mixer. Alternatively, it could be a method for mechanosynthesis.

During step c), a beam of sufficient energy is used to melt at least the first particles 10.

The deposited layer can be melted locally or totally.

The melting step makes it possible to create melted patterns in the layer of the mixture of powders. One or more areas of melted particles can be made to form the desired pattern. The particles 10 forming the pattern melt completely so that during the solidification (step d), one or more solidified areas of an aluminium alloy are formed.

Advantageously, steps b), c) and d) may be repeated at least once so as to form at least one other solidified area on the first solidified area. The method is repeated until the final form of the part is obtained.

The non-solidified powders are then evacuated and the final part is detached from the substrate.

The part obtained, according to one of these methods, may be subjected to an annealing step (heat treatment) to reduce internal stresses and improve the mechanical properties.

According to a first embodiment, the method is a Powder Bed Laser Fusion (FBLF) process, also known as Powder Bed Fusion (PBF) and erroneously as selective laser melting (SLM). By way of illustration and in a non-limiting manner, the parameters of the powder bed laser fusion manufacturing method are:
between 50 and 500 W for the laser power,
between 100 and 2000 mm/s for the laser speed,
between 25 and 120 μm for the distance between two vector spaces (hatch),
between 15 and 60 μm for the layer thickness.

According to another embodiment, the method is an electron beam melting (EBM) process on a powder bed. By way of illustration and in a non-limiting manner, the parameters of the EBM manufacturing process on a powder bed are:
between 50 and 3000 W for the electron beam,
between 100 and 8000 mm/s for the beam speed,
between 50 and 200 μm for the distance between two vector spaces,
between 30 and 150 μm for the layer thickness.

The depositing machines used for additive manufacturing methods comprise for example a powder delivery system, a device for spreading and homogenising the surface of the powder ("roller" or "blade"), a beam (for example an infrared laser beam with a wavelength of about 1060 nm), a scanner for directing the beam, and a substrate (also referred to as a tray) which can be lowered vertically (according to a Z-axis perpendicular to the powder bed).

The assembly can be confined in a thermally closed and inerted enclosure to control the atmosphere, but also to avoid the dissemination of the powders.

Although this is by no means limiting, the invention can be applied in particular in the field of aeronautics and in the automotive field.

Illustrative and Non-Limiting Examples of an Embodiment

In this example, cube-shaped parts with dimensions 10 mm*10 mm*10 mm are manufactured by SLM printing.

The part is obtained from a mixture of two powders: an aluminium alloy powder and a $ZrSi_2$ powder.

The particle size of the aluminium alloy powder (Al6061), measured by a particle size laser on a Malvern Panalytical Mastersizer 2000 device, is as follows: $d_{10}$=27.5 µm, $d_{50}$=41.5 µm and $d_{90}$=62.7 µm. The powder is observed by SEM (FIG. 1).

With regard to the $ZrSi_2$ powder, its particle size is about 500 nm.

The mixture of the two powders is made in a glove box from: 1200 mL aluminium alloy powder to be refined, 17 mL $ZrSi_2$ powder (mixture at 1.4% by volume, which represents 1.9 wt. %), and 250 mL of 5 mm diameter zirconia beads, used for homogenising the mixture. The volume of the mixing pot is 6.5 L.

The filling rate, defined as the ratio of the volume represented by particles 10, particles 20 and zirconia beads to the volume of the mixing pot, is approximately 23%.

The mixture is passed through a 3D dynamic mixer, for example the Turbula®, for 10 h.

The mixture is then returned to the glove box to be screened coarsely (1 mm) to recover the zirconia beads.

Figure 2:
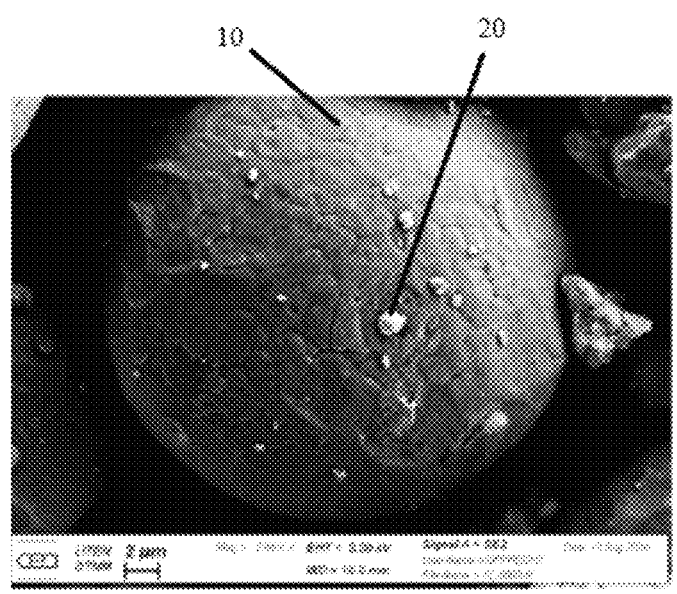
FIG. 2 is an image obtained by scanning electron microscope (SEM) of aluminium particles and 1.9 wt. % $ZrSi_2$ particles in a particular embodiment of the invention.

The mixture of powders was observed by SEM (FIG. 2). The aluminium alloy particles 6061 appear in grey and the particles of $ZrSi_2$ in white.

The mixture of powder is then used to manufacture parts by 3D printing.

For example, the SLM conditions that make it possible to obtain the densest cubes are as follows: laser power: 189-270 W; laser speed: 400-800 mm/s, vector space: 100 µm; layer thickness (powder bed): 20 µm.

For comparison, an aluminium part is made without adding $ZrSi_2$ powders.

Figure 3:
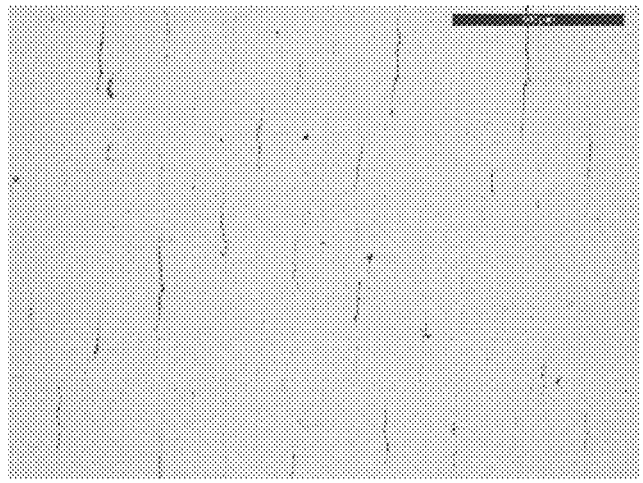
FIG. 3 is an image obtained by an optical microscope in the YZ plane (Z being the construction axis and Y the axis perpendicular to the displacement of the laser in the horizontal plane) of a part made from particles of an aluminium alloy 6061.
Figure 4:
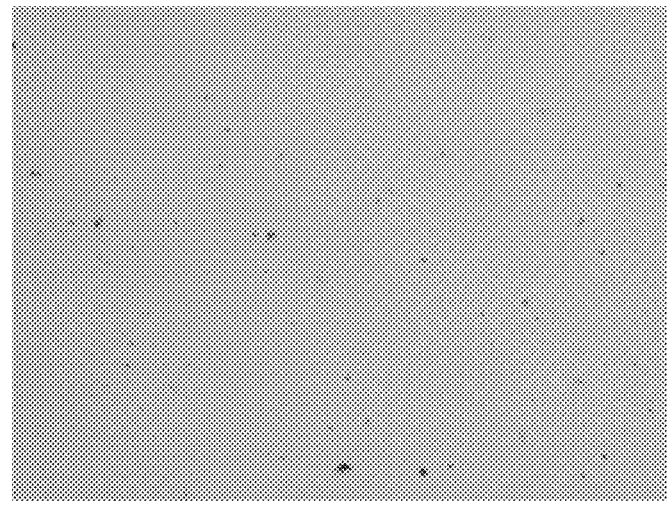
FIG. 4 is an image obtained by optical microscope in the YZ plane of a part made from a mixture of particles of aluminium alloy 6061 and 1.9 wt. % $ZrSi_2$ particles in a particular embodiment of the invention.

The part manufactured solely with aluminium powder (FIG. 3) has cracks. The part obtained with the mixture of powders containing 1.9 wt. % $ZrSi_2$ powder is a dense part (>99%) without cracks (FIG. 4).

Figure 5:
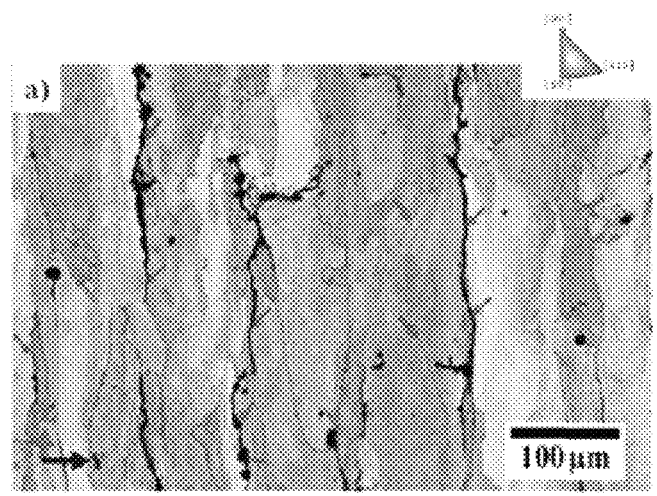
FIG. 5 is an image in electron backscatter diffraction (EBSD) in the YZ plane of a part made from aluminium alloy 6061 particles.
Figure 6:
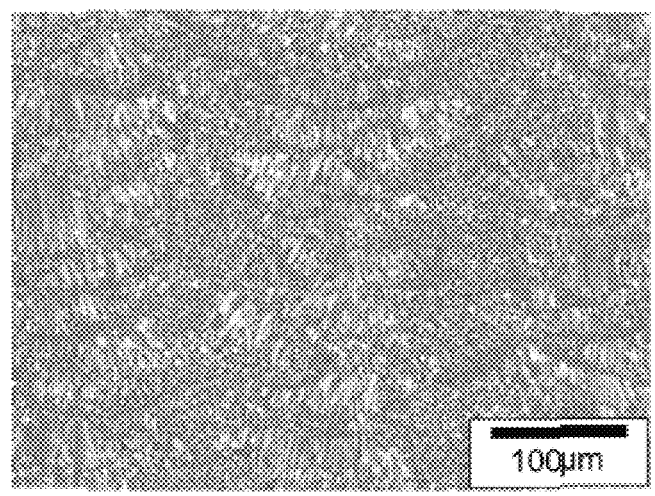
FIG. 6 is an image in electron backscatter diffraction (EBSD) in the YZ plane of a part made from a mixture of particles of an aluminium alloy 6061 and 1.9 wt. % $ZrSi_2$ particles, according to a particular embodiment of the invention.

The part manufactured without adding $ZrSi_2$ powder and the one manufactured with 1.9 wt. % $ZrSi_2$ were characterised by backscattered electron diffraction (FIGS. 5 and 6 respectively): the addition of 1.9 wt. % $ZrSi_2$ leads to a refinement of the microstructure, making it possible to avoid the problem of hot cracking.

REFERENCES

1. Stemmer et al "Thermodynamic considerations in the stability of binary oxides for alternative gate dielectrics in complementary metal-oxide-semiconductors" J. Vac. Sci. Technol. B 22 (2004), 791.
2. Clouet et al "Nucleation of Al 3 Zr and Al 3 Sc in aluminum alloys: From kinetic Monte Carlo simulations to classical theory", Phys. Rev. B 69 (2004), 064109.
3. Knipling et al "Nucleation and Precipitation Strengthening in Dilute Al—Ti and Al—Zr Alloys" Metal and Mat Trans A 38 (2007), 2552-2563.

The invention claimed is:

1. Method for manufacturing an aluminium alloy part by additive manufacturing comprising a step in which a layer of a mixture of powders is locally melted then solidified, wherein the mixture of powders comprises:
    first particles comprising at least 80 wt. % aluminium and up to 20 wt. % one or more additional elements, and
    second particles of $ZrSi_2$,
    the mixture of powders comprising 1.8 wt. % to 4 wt. % second particles, and wherein, during the additive manufacturing, $ZrSi_2$ decomposes to form in situ an $Al_3Zr$ germinating phase.
2. Method according to claim 1, wherein the mixture of powders comprises 1.9 wt. % to 2.5 wt. % second particles.
3. Method according to claim 1, wherein the second particles have a size ranging from 50 nm to 5000 nm.
4. Method according to claim 1, wherein the second particles have a size ranging from 100 nm to 1000 nm.
5. Method according to claim 1, wherein the second particles have a size ranging from 400 nm to 600 nm.
6. Method according to claim 1, wherein the first particles have a size ranging from 10 µm to 120 µm.
7. Method according to claim 1, wherein the first particles have a size ranging from 20 µm to 65 µm.
8. Method according to claim 1, wherein the additional elements are selected from Cu, Si, Zn, Mg, Fe, Ti, Mn, Zr, Va, Ni, Pb, Bi and Cr.
9. Method according to claim 1, wherein the aluminium alloy is alloy 7075, alloy 6061, alloy 2219 or alloy 2024.
10. Method according to claim 1, wherein the manufacturing method is a selective laser melting process.
11. Method according to claim 1, wherein the manufacturing method is a selective electron beam melting process.
12. Method according to claim 1, wherein the mixture of powders is produced in a 3D dynamic mixer.

* * * * *